United States Patent [19]

Gatewood

[11] 4,057,134
[45] Nov. 8, 1977

[54] AUTOMATIC CLUTCH WEAR ADJUSTER

[75] Inventor: Sidney Ulane Gatewood, Roseville, Mich.

[73] Assignee: Borg-Warner Corporation, Chicago, Ill.

[21] Appl. No.: 691,059

[22] Filed: May 28, 1976

[51] Int. Cl.² .......................................... F16D 13/75
[52] U.S. Cl. ............................................. 192/111 A
[58] Field of Search ........................ 192/70.25, 111 A

[56] References Cited

U.S. PATENT DOCUMENTS

| 1,968,274 | 7/1934 | Wemp | 192/111 A |
| 2,002,841 | 5/1935 | Tatter | 192/111 A |
| 2,040,034 | 5/1936 | Tatter | 192/111 A |
| 2,421,869 | 6/1947 | Brock | 192/111 A |
| 3,286,803 | 11/1966 | Zeidler | 192/111 A |
| 3,433,341 | 3/1969 | Bohn et al. | 192/111 A |
| 3,938,636 | 2/1976 | Nerska | 192/111 A |
| 3,946,845 | 3/1976 | Kamio | 192/111 A |

Primary Examiner—Benjamin W. Wyche
Attorney, Agent, or Firm—James A. Geppert

[57] ABSTRACT

An automatic clutch wear adjuster incorporated in a clutch release bearing assembly which automatically compensates for facing or lining wear while maintaining clearance between the release bearing and clutch release levers in the engaged position of the clutch to provide the requisite free play at the clutch pedal and eliminate undesirable constant bearing engagement. The bearing assembly includes a sleeve encompassing the driven shaft, a collar telescoped on the sleeve, and a pair of oppositely disposed one-way clutches between the collar and sleeve to prevent relative movement between the sleeve and collar except where the clutch linings are worn resulting in greater return movement of the release levers. Where wear has occurred, the sleeve will move relative to the collar to adjust the length of the bearing assembly and retain the desired clearance between the bearing and release levers.

21 Claims, 5 Drawing Figures

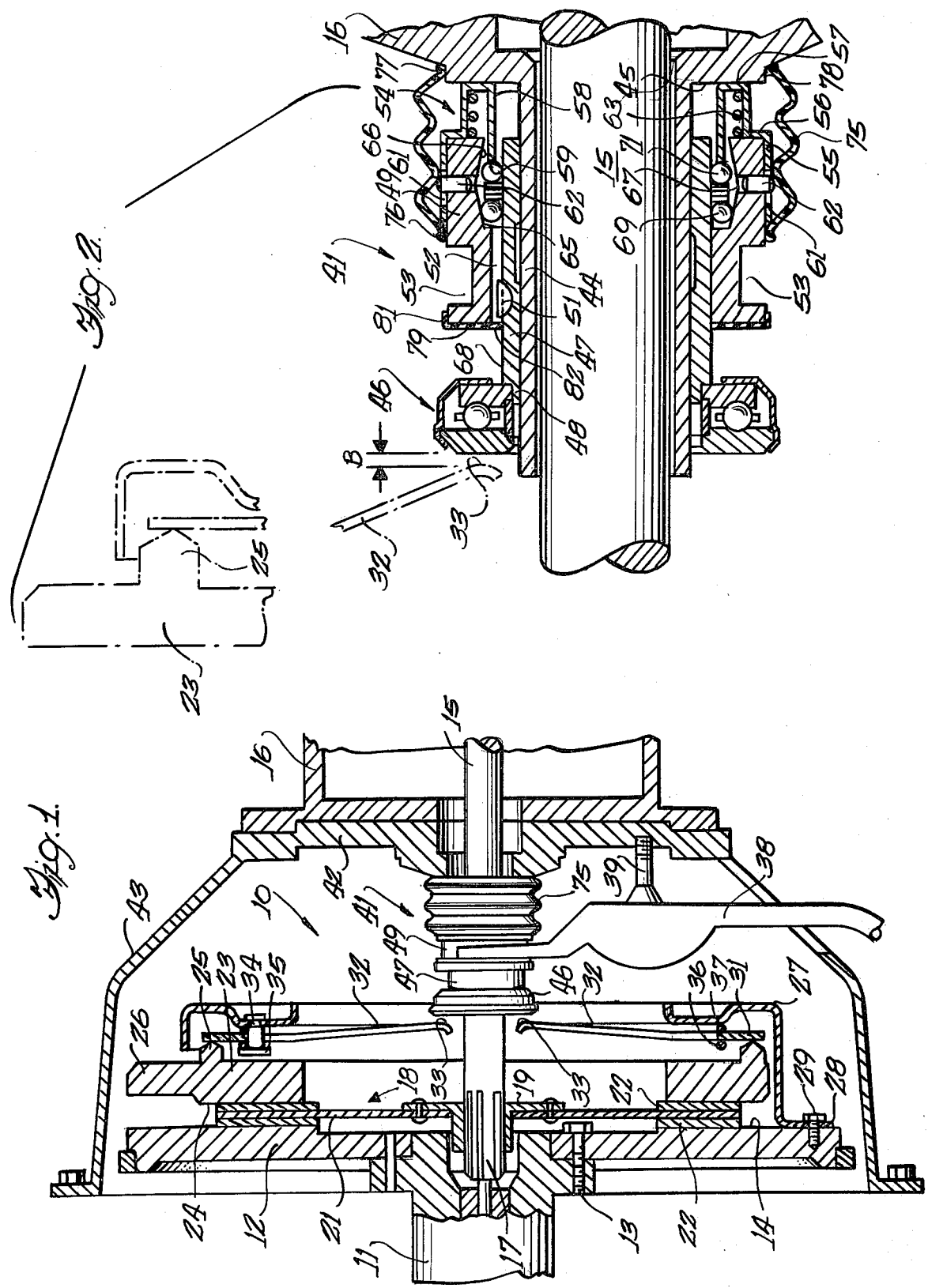

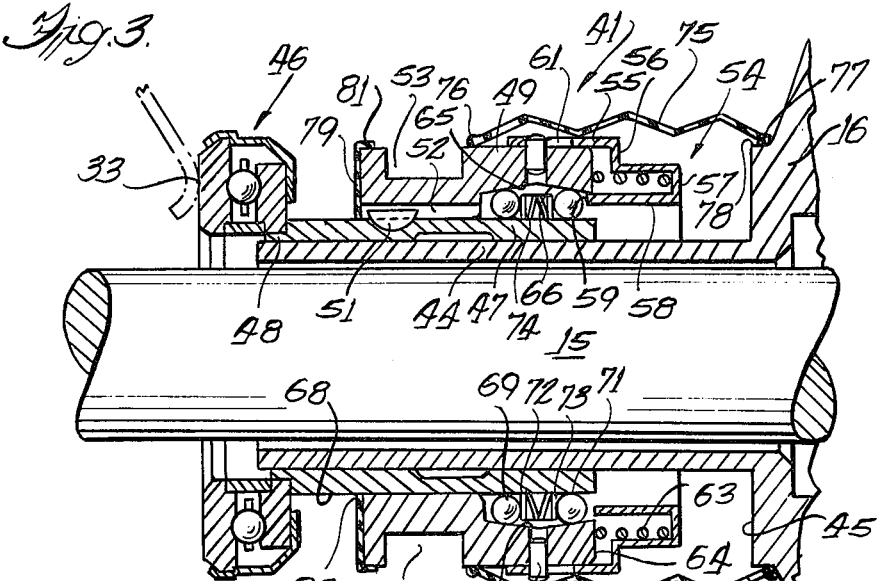
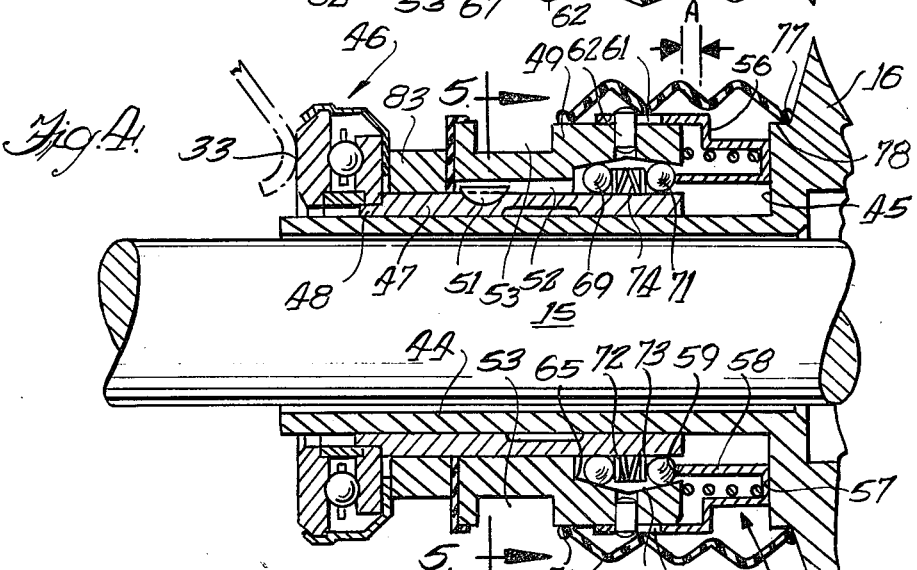
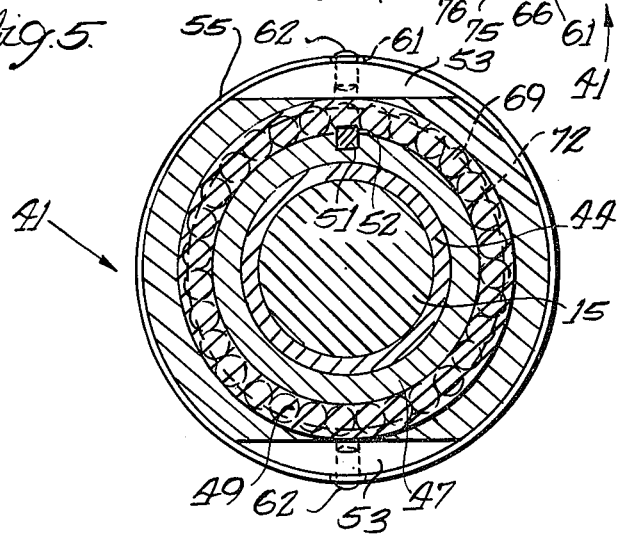

AUTOMATIC CLUTCH WEAR ADJUSTER

BACKGROUND OF THE INVENTION

The present invention relates to vehicle torque transmitting clutches of the direct pressure type where a release bearing is utilized to operate the clutch release levers or spring fingers and disengage the driven clutch plate from the driving flywheel and pressure plate. Over a long period of use, the clutch disc facings or linings exhibit wear and the clutch spring or springs causes the pressure plate to move closer to the flywheel to fully engage the clutch.

Where an initially adjusted amount of clearance normally exists between the release bearing and the clutch release levers or spring fingers, the wear of the clutch disc facings forces the levers or spring fingers into direct pressure engagement with the release bearing and binds the bearing against the release fork causing the clutch slippage. To alleviate this problem, the operator of the vehicle must have the clutch serviced when clutch slippage due to wear becomes pronounced. Such manual adjustment consists of altering the angle of the clutch release fork to reposition the release carrier and bearing until the normal clearance between the bearing and clutch release levers or spring fingers is restored. It is a well known fact that a large percentage of clutch failures in various types of vehicles is due to operator neglect of maintaining free play in the clutch which represents the clearance between the clutch fingers and the bearing.

To overcome this problem, various methods of automatic adjustment of the clutch release carrier were attempted; however, in most instances, the bearing on the release carrier was maintained in contact with the clutch release levers or spring fingers resulting in undesirable wear and/or noise caused by the constant engagement. The present invention overcomes the problems of previous automatic adjustment devices in providing a self-contained automatic wear adjuster having a predetermined clearance between the release bearing and the release levers or fingers.

SUMMARY OF THE INVENTION

The present invention comprehends an improved automatic wear adjuster incorporated in the release bearing carrier assembly for the clutch of an automotive vehicle which provides the required free play at the clutch pedal and automatically compensates for lining wear while maintaining clearance between the bearing and the clutch release fingers or levers. The release bearing carrier assembly includes a pair of telescoped tubular members arranged to allow relative axial movement therebetween, with the inner member supporting the release bearing for the clutch at its forward end. A yieldably biased clutching means is positioned between the tubular members to normally prevent relative axial movement therebetween unless wear of the clutch disc facings has occurred.

The present invention also comprehends the provision of an automatic wear adjuster that is self-contained within the release bearing carrier assembly. The release bearing, telescoping tubular members, a reactor, and clutching means are all contained within the carrier assembly which is mounted for axial movement on a stationary portion of the transmission housing, with a shoulder on the transmission housing providing a reaction surface for the reactor. A bellows-type seal extends between the outer tubular member and the transmission housing and a face type seal is mounted on the outer tubular member in sealing engagement with the inner tubular member to inhibit the entrance of dirt or other foreign matter into the device while retaining lubricant therein.

The present invention further comprehends the provision of an automatic wear adjuster in a release bearing carrier assembly which provides a fool-proof installation with a vehicle clutch. The carrier assembly is adjusted to an overall predetermined length and held thus by a "C" shaped spacer on the inner tubular member located between the bearing and the outer tubular member. Upon assembly of the device in operative position on the transmission, the release fork is engaged with the outer tubular member and, the spacer is removed. The transmission is moved into operative engagement with the clutch and the release fork connected to the pedal linkage so that the action of a suitable pedal return spring causes retraction of the outer tubular member over a distance providing the required clearance between the bearing and the clutch fingers and the necessary free play in the clutch pedal.

The present invention also comprehends the provision of an automatic wear adjuster utilizing an inner sleeve, an outer collar telescoped over the sleeve, a reactor partially telescoped over the collar and having means providing for limited relative movement therebetween, and clutch means between the collar and sleeve. The clutch means comprises a pair of oppositely disposed one-way clutches where the clutching means are continuously biased towards their engaged positions. At all times, at least one, and sometimes both, of the one-way clutches is in constant contact ready for instant engagement, and there is no lost motion between the telescoping sleeve and collar due to lack of engagement of the one-way clutches.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a vertical cross-sectional view of a typical clutch assembly embodying the clutch release bearing carrier of the present invention with the carrier shown in elevation.

FIG. 2 is an enlarged vertical cross-sectional view of the automatic wear adjuster in the clutch release carrier with the clutch in its engaged position.

FIG. 3 is a vertical cross-sectional view similar to FIG. 2 but showing the release carrier in the clutch disengaged position.

FIG. 4 is a vertical cross-sectional view similar to FIG. 2, but showing the parts with a spacer located therein for packaging before installation.

FIG. 5 is a vertical cross-sectional view taken on the line 5—5 of FIG. 4 with the seals omitted.

DESCRIPTION OF THE PREFERRED EMBODIMENT

Referring more particularly to the disclosure in the drawings wherein is shown an illustrative embodiment of the present invention, FIG. 1 discloses a clutch assembly 10 for an automatic vehicle wherein a driving shaft 11 from the vehicle engine (not shown) is suitably secured by bolts 13 to a flywheel 12 having a friction face 14. A driven shaft 15 extends from the clutch assembly to the vehicle transmission (not shown) in a transmission housing 16 and has a splined forward end 17 receiving thereon a clutch hub 19 of a clutch disc 18. The clutch disc includes the hub 19 and an annular plate 21 secured thereto and having clutch friction facings or linings 22,22 adjacent the outer periphery of and on the opposite surfaces of the plate.

A generally annular pressure plate 23 is positioned on the opposite side of the clutch disc 18 from the flywheel with a friction face 24 towards the clutch disc and an annular fulcrum 25 on the opposite surface thereof. The pressure plate has circumferentially spaced drive lugs 26 extending radially from the plate periphery which are operatively connected to a clutch cover 27 to cause the pressure plate, cover and flywheel 12 to rotate together. The connection from the lug 26 to the clutch cover 27 may be in the form of a drive strap (not shown) which is preloaded upon assembly to act as a retractor spring for the pressure plate relative to the clutch disc. The cover 27 encompasses the clutch disc and pressure plate and has a central opening for the driven shaft as well as a mounting flange 28 at its outer periphery secured by bolts 29 to the flywheel 12.

A diaphragm or Belleville spring 31 has an outer annular portion engaging the fulcrum 25 and a plurality of radially inwardly extending spring fingers 32 terminating short of the driven shaft 15 in contact surfaces 33. A plurality of shoulder rivets 34 are secured in the clutch cover 27 with each rivet extending through an opening in the spring 31 and terminating in an enlarged head 35 supporting a round wire hoop 36 that engages the spring; a second round wire hoop 37 being positioned between the spring and the clutch cover 27. The hoops 36,37 cooperate with the spring 31 to provide pivot surfaces for the spring to actuate the pressure plate and release or engage the clutch disc 18 between the pressure plate 23 and the flywheel 12.

A release bearing carrier assembly 41 is mounted for axial sliding motion relative to the driven shaft 15 and is actuated by a release fork 38 pivotally mounted in the transmission housing 16 by a pivot member 39 on a rear wall 42 of the housing; the housing 16 having an enlarged bell portion 43 encompassing the clutch assembly 10. The housing 16 includes a stationary or support sleeve 44 extending forwardly of the rear wall 42 to closely encompass the driven shaft 15 and terminating at a point generally radially aligned with the contact surfaces 33 of the spring fingers 32; the sleeve 44 providing a support surface for the sliding movement of the carrier assembly. Also, the rear wall 42 has a stop shoulder 45 cooperating with the carrier assembly.

The carrier assembly 41 includes a release bearing 46 mounted on a reduced end portion 48 of a carrier sleeve 47 encompassing the support sleeve 44. An annular collar 49 is telescoped over the sleeve 47 for relative axial movement therebetween; and a key 51 in the sleeve 47 is received in an axial keyway 52 in the interior surface of the collar 49 to prevent relative rotation therebetween. The collar is provided with a pair of oppositely disposed slots 53 to receive the ends of the release fork 38; the fork preventing rotation of the collar, and the key and keyway connecting the collar and sleeve preventing rotation of the sleeve 47.

Partially telescoped over the collar 49 is a generally annular reactor 54 having an outer cylindrical wall 55 provided with an inwardly extending offset 56, a base portion 57 adapted to engage the shoulder 45, and an inner cylindrical wall 58 terminating in a stop surface or edge 59. The outer wall 55 has a pair of oppositely disposed axially elongated slots 61 receiving the ends of pins 62 extending radially from and secured in the collar 49; the pins 62 and slots 61 allowing limited relative axial movement between the collar and the reactor. A compression spring 63 is positioned within the reactor with one end contacting the base portion 57 and the opposite end engaging the rear end 64 of the collar.

The interior surface of the collar is cut-away for approximately the rear half to provide a recess receiving the stop edge 59 of the inner wall 58; the cut-away portion defining a pair of oppositely disposed inclined surfaces 65 and 66 diverging from a central intersection 67 with each surface converging toward the outer cylindrical surface 68 of the sleeve 47. The inclined surfaces 65 and 66 provide outer clutching surfaces for two sets of balls 69 and 71, respectively, with each set of balls providing a full complement in the recess, thus eliminating the need to cage them. The ball sets 69 and 71 cooperating with their respective inclined surfaces 65 and 68 and with the surface 68 form a pair of oppositely disposed axial one-way clutches. A pair of annular washers 72 and 73 engage the sets of balls 69 and 71, respectively, with the washers positioned between the two ball sets, and suitable biasing means 74 is positioned between the washers to continuously urge them outwardly to engage the sets of balls. The biasing means 74 may take the form of two or more Belleville springs or a spring of the wave or undulating type. Depending on the type of springs utilized, the washers may be omitted.

To inhibit the entrance of dirt or other contaminating material into the carrier assembly while retaining any necessary lubricant therein, a bellows-type seal 75 is positioned to encompass the outer reactor wall 55 with one end bead 76 of the seal engaging the outer surface of the collar 49 and the opposite end bead 77 engaging a cylindrical surface 78 of the shoulder 45. Also, a second seal 79 formed of suitable synthetic material is radially positioned on the forward end of the collar 49 with a flange 81 overlapping the outer cylindrical surface thereof and the inner peripheral edge 82 is in engagement with the outer surface 68 of the carrier sleeve 47 and provides a frictional drag between the collar and sleeve.

FIG. 4 shows the carrier assembly 41 as it would be packaged for installation with a "C" shaped spacer 83 positioned on the sleeve 47 between the release bearing 47 and the collar 49 and seal 79. The assembly is adjusted to a predetermined overall length and the spacer of predetermined thickness placed in position. Upon assembly on the stationary or support sleeve 44 of the transmission, the reactor 54 engages the shoulder 45; and the bead 44 of the bellows seal 75 is positioned on the surface 78. The inner end of the release fork 38 is engaged in the slots 53 in the collar 49 and the spacer 83 is removed. The transmission is then moved up and secured to the engine with the bearing 46 contacting the surfaces 33 of the spring fingers 32, and the outer end of the release fork is connected to the vehicle clutch pedal linkage (not shown). The action of a suitable pedal return spring retracts the collar 49 for a distance "A" (see FIG. 4) so that the rear end 64 of the collar 49 abuts the offset 56 in the reactor 54 against the force of the spring 63. This provides the required clearance "B" (FIG. 2) between the bearing 46 and the clutch fingers 32 and the necessary free play in the clutch pedal.

The pedal return spring is not shown but may be of any conventional type for a pedal linkage utilized in the present assembly. Reference to a pedal return spring refers to the fact that in any linkage system connecting the clutch pedal to the bearing carrier, there must be a spring to disengage the release bearing from the clutch fingers and retract the pedal to a stop.

FIG. 2 discloses the clutch engaged position with the bearing carrier assembly 41 at rest. At the initiation of release of the clutch to its disengaged position, the vehicle operator depresses the clutch pedal to actuate the release fork and move the collar 49 and sleeve 47 forward together relative to the reactor 54 with the inherent frictional drag of the balls 69 engaging the inclined surface 65 and surface 68 and the drag of the seal 79 engaging the surface 68 of the sleeve 47 combining to overcome the drag between the sleeve 47 and the support sleeve 44. At about the time the bearing 46 engages the contact surfaces 33 of the clutch fingers 32, the collar 49 has moved away from the stop edge 59 to allow the balls 71 to engage the inclined surface 66 and the sleeve surface 68 and provide a positive drive for the simultaneous movement of the collar 49 and sleeve 47 during the balance of the clutch release stroke.

When the pins 62 engage the left-hand ends of the slots 61, the pins 62 and collar 49 carry the reactor 54 away from the shoulder 45. During the release stroke, the clutch fingers 32 are moved to the left, as seen in FIG. 1, to cause the Belleville spring 31 to pivot about the hoop 36 and release pressure from the pressure plate 23; retraction of the pressure plate resulting from the preloaded drive straps (not shown) connecting the drive lugs 26 and the cover 27, or other suitable retractive means, so that the clutch disc is released from frictional engagement with the flywheel 12 and pressure plate 23. The clutch released position of the release bearing carrier 41 is shown in FIG. 3.

Assuming that no wear has occurred to the friction facings 22 of the clutch disc, upon release of the clutch pedal to re-engage the clutch, the Belleville spring 31 has the tendency to resume its initial position and thus pivots about the hoop 37 to cause the pressure plate 23 to move toward the flywheel 12. Also, the clutch fingers 32 act to push back the bearing carrier 41 assisted by the pedal return spring; the balls 69 engaging the surfaces 65 and 68 acting to move the collar simultaneously with the sleeve. When the clutch fingers have reached the fully engaged position for the clutch, the base portion 57 of the reactor 54 contacts the stop shoulder 45 and the stop edge 59 is in contact with the balls 71 in the position seen in FIG. 4. As the operator's foot is lifted from the pedal, the return spring (not shown) acting through the linkage and release fork 38 retracts the collar 49 relative to the reactor 54 so that the stop edge 59 releases the balls 71. The balls 69 meanwhile being already engaged with the inclined surface 65 and sleeve surface 68 cause the sleeve 47 to move back with the collar 49 until the rear end 64 of the collar engages the offset 56 of the reactor as shown in FIG. 2. This provides an effective stop for the clutch pedal, eliminating the usual pedal stop under the vehicle cowl.

On the other hand, where wear has occurred on the friction facings of the clutch disc, the release of the clutch by depression of the clutch pedal provides the same action as recited previously. However, when the pedal is released and the clutch fingers 32 move rearwardly to urge the bearing carrier toward the stop 45, the fingers will tend to pivot through a greater arc of movement so that the pressure plate 23 will move to full engagement of the clutch. Since the clutch fingers are assuming a greater height due to increased movement of the pressure plate, rearward movement of the bearing carrier 41 continues such that when the reactor 54 engages the shoulder 45 and the reactor stop edge 59 engages and causes release of the balls 71, the fingers 32 seeking their new position push back the sleeve 47 relative to the collar 49 to a new position.

This motion of the sleeve 47 relative to the collar 49 shortens the overall length of the carrier by the amount of wear of the clutch facings 22 which has occurred measured in terms of change in the height of the clutch fingers. The balls 69, although engaged with their respective surfaces, are overrunning during this shortening action. Then, as the pedal return spring continues to retract the collar 49, the balls 69 already contacting the engaging surfaces act to drive the sleeve 47 in unison with the collar 49 until the reactor 54 stops movement by contact with the rear end 64 of the collar (FIG. 2).

As the clutch is subsequently released by depression of the clutch pedal, the operation is repeated except that now the overall length of the bearing carrier 41 has been reduced due to wear. The free play "B" between the bearing 46 and the clutch fingers 32, which proportionately represents free play at the clutch pedal is provided by the predetermined clearance at "A" between the reaction offset 56 and the rear end 64 of the collar. The pedal return spring must be stronger than the spring 63, which in turn can be stronger or weaker than the ball biasing means 74. Also, the biasing means 74 acts, in combination with the washers 72, 73 to apply a continuous load on the two sets of balls 69 and 71 so that at least one set and, at other times, both sets are engaged with the sleeve 47 and the collar 49. It is preferred that the collar 49 and sleeve 47 be formed of a case hardened steel so as to resist brinnelling by the steel balls 69 and 71.

Since adjustment of the clutch assembly due to wear of the clutch facings is automatic and does not depend upon the vehicle owner waiting until clutch slippage occurs before spending the time and money to have the clutch serviced, the amount of free play in the clutch can be safely reduced, thereby resulting in shortened pedal travel and/or permitting a change in the linkage ratio to reduce pedal effort. Reference has been made mainly to the Belleville spring type of the clutch however it should be understood that the invention can be utilized with any clutch. Although a push-type clutch is described and shown in the drawings, this automatic wear adjustment device is equally adaptable to a pull-type clutch without any substantial assembly changes.

I claim:

1. A self-adjusting clutch release bearing assembly operated by a clutch release fork, the clutch including clutch release levers adapted to be engaged by a release bearing to disengage the clutch, said bearing assembly comprising a bearing carrier adapted to axially reciprocate on the driven shaft and including a sleeve encompassing the driven shaft and supporting the release bearing, a collar telescoped over said sleeve and adapted to move relative thereto, means to limit movement of said collar away from said clutch, said clutch release fork being operatively connected to said collar, a pair of opposed one-way clutches between said sleeve and collar, and biasing means urging said one-way clutches apart so that at least one clutch is always engaged with said collar and sleeve and, at other times, both clutches are engaged with said collar and sleeve.

2. A self-adjusting clutch release bearing assembly as set forth in claim 1 adjacent a transmission, including means in said sleeve and said collar to allow relative axial movement but prevent relative rotation therebetween.

3. A self-adjusting clutch release bearing assembly as set forth in claim 1, in which said transmission includes a support sleeve projecting therefrom and encompassing said driven shaft, said bearing carrier adapted to axially reciprocate on said support sleeve.

4. A self-adjusting clutch release bearing assembly as set forth in claim 1, in which said movement limiting means comprises a reactor having an outer cylindrical wall partially encompassing said collar and an inner cylindrical wall joined by a base portion, and biasing means between said reactor base portion and said collar.

5. A self-adjusting clutch release bearing assembly as set forth in claim 4, including means in said collar and reactor to limit relative axial movement therebetween.

6. A self-adjusting clutch release bearing assembly as set forth in claim 5, in which said motion limiting means includes a pair of oppositely disposed pins projecting radially outwardly from said collar, said outer reactor wall having a pair of oppositely disposed axially elongated slots receiving the outer ends of the pins.

7. A self-adjusting clutch release bearing assembly as set forth in claim 4, in which said outer reactor wall has an inwardly extending offset acting as a stop to be engaged by the rear end of said collar, and a stop shoulder on the transmission adapted to be engaged by said reactor base portion.

8. A self-adjusting clutch release bearing assembly as set forth in claim 1, in which the interior surface of said collar adjacent the rear end is cut away to provide a recess, and said pair of one-way clutches include a pair of oppositely inclined surfaces formed in said recess, a plurality of balls adapted to engage each inclined surface and wedge between the inclined surface and the exterior surface of said sleeve, said inclined surfaces diverging from a central intersection and each converging toward said sleeve.

9. A self-adjusting clutch release bearing assembly as set forth in claim 8, wherein said sets of balls provide a forward set toward said bearing and a rearward set adjacent said reactor stop edge, such that said rearward set is in operative engagement upon forward movement of said collar and said forward set is in operative engagement upon rearward movement of said collar, said reactor engaging said stop shoulder and said stop edge engaging said rearward set upon rearward movement of said collar relative to said reactor.

10. A self-adjusting clutch release bearing assembly as set forth in claim 9, wherein wear of the clutch friction facings will result in greater travel of said clutch release arms to push said carrier toward said stop shoulder, such that upon engagement of said reactor with said shoulder and engagement of said rearward set of balls with said reactor stop edge, further movement of said levers will cause said movable sleeve to shift rearwardly relative to said collar to alter the length of said bearing assembly, said forward set of balls overrunning upon movement of said movable sleeve relative to said collar.

11. A self-adjusting clutch release bearing assembly as set forth in claim 8, in which said clutch biasing means includes at least one spring engaging and biasing both sets of balls apart.

12. A self-adjusting clutch release bearing assembly as set forth in claim 11, including a reactor having an outer cylindrical wall and an inner cylindrical wall joined by a base portion, said outer wall partially encompassing said collar and said inner wall terminating in a stop edge adapted to engage one set of balls.

13. A self-adjusting clutch release bearing assembly as set forth in claim 12, including spring biasing means between said reactor base portion and said collar, said outer reactor wall having an inwardly extending offset adapted to act as a stop for said collar, and a stop shoulder on said transmission adapted to be engaged by said reactor base portion.

14. A self-adjusting clutch release assembly as set forth in claim 13, including a pair of oppositely disposed pins on said collar, and said outer reactor wall having a pair of oppositely disposed axially elongated slots receiving said pins to limit relative axial movement between said collar and reactor.

15. A self-adjusting clutch release bearing assembly as set forth in claim 1, including a bellows seal encompassing said collar and in sealing engagement with said collar and transmission, and a second seal on said collar and in contact with said sleeve.

16. A self-adjusting clutch release bearing assembly as set forth in claim 1, including a "C" shaped spacer adapted to be positioned on said sleeve between said bearing and said collar when said assembly is packaged prior to installation to preserve a predetermined adjusted length of the assembly.

17. A self-adjusting clutch release bearing assembly operated by a clutch release fork and positioned on a driven shaft between a clutch and a transmission for a vehicle, the clutch including clutch release arms adapted to be engaged by a release bearing to disengage the clutch and said transmission including a stationary sleeve extending towards said clutch and encompassing the driven shaft, said bearing assembly comprising a bearing carrier axially reciprocable on said stationary sleeve and including a movable sleeve encompassing said stationary sleeve and supporting the release bearing on the end adjacent said clutch, a collar telescoped over said movable sleeve and operatively connected to said release fork, means to permit relative axial movement between said movable sleeve and collar but prevent relative rotation therebetween, said release fork preventing rotation of said collar, a reactor having an outer cylindrical wall partially encompassing said collar and an inner cylindrical wall joined by a base portion, said outer reactor wall having an offset providing a stop for the rear end of said collar, a pair of oppositely disposed pins extending outwardly from said collar, said outer reactor wall having a pair of axially elongated slots receiving said pins to limit relative axial movement between said collar and reactor, a compression spring extending between said reactor base portion and said collar, a stop shoulder on said transmission adapted to be engaged by said reactor base portion, said collar being cutaway at the rear portion of its interior surface to provide a pair of inclined surfaces diverging from a central point with each surface converging toward the exterior surface of said movable sleeve, a plurality of balls adapted to engage each inclined surface to form a one-way clutch between each inclined surface and said movable sleeve, a flat washer engaging each set of balls, and spring biasing means between and urging said washers outwardly against said sets of balls such that at least one set of balls and, at other times, both sets of balls are in continuous engagement with said collar and sleeve, said reactor inner wall terminating in a stop edge adapted to extend into said cut-away portion of the collar and engage the adjacent set of balls when said collar is retracted into said reactor, a bellows seal encompassing said collar and reactor and in sealing engagement with said collar and transmission, and a second seal on the front end of said collar in contact with said movable sleeve.

18. A self-adjusting clutch release bearing assembly as set forth in claim 17, including a "C" shaped spacer adapted to be positioned on said movable sleeve between said release bearing and said collar when said assembly is packaged prior to installation to preserve the predetermined adjusted length of the assembly.

19. A self-adjusting clutch release bearing assembly as set forth in claim 17, wherein said sets of balls provide a forward set toward said bearing and a rearward set adjacent said reactor stop edge, such that said rearward set is in operative engagement upon forward movement of said collar and said forward set is in operative engagement upon rearward movement of said collar, said reactor engaging said stop shoulder and said stop edge engaging said rearward set upon rearward movement of said collar relative to said reactor.

20. A self-adjusting clutch release bearing assembly as set forth in claim 19, wherein wear of the clutch friction facings will result in greater travel of said clutch release arms to push said carrier toward said stop shoulder, such that upon engagement of said reactor with said shoulder and engagement of said rearward set of balls with said reactor stop edge, further movement of said levers will cause said movable sleeve to shift rearwardly relative to said collar to alter the length of said bearing assembly, said forward set of balls overrunning upon movement of said movable sleeve relative to said collar.

21. A self-adjusting clutch release bearing assembly as set forth in claim 17, in which said rotation preventing means comprises a key in said movable sleeve received in an axial keyway in said collar.

* * * * *